US012748460B2

(12) United States Patent
DeVoe et al.

(10) Patent No.: US 12,748,460 B2
(45) Date of Patent: Sep. 29, 2026

(54) WEARABLE DEVICE HARDWARE INTERACTION SYSTEM FOR ARTIFICIAL INTELLIGENCE AND COMPUTING SYSTEMS

(71) Applicant: Sesame AI, Inc., Los Angeles, CA (US)

(72) Inventors: Matthew DeVoe, Kirkland, WA (US); Justin Alvey, San Francisco, CA (US)

(73) Assignee: Sesame AI, Inc., Los Angeles, CA (US)

( * ) Notice: Subject to any disclaimer, the term of this patent is extended or adjusted under 35 U.S.C. 154(b) by 0 days.

(21) Appl. No.: 19/003,155

(22) Filed: Dec. 27, 2024

(65) Prior Publication Data

US 2026/0186530 A1 Jul. 2, 2026

(51) Int. Cl.
*G06F 1/16* (2006.01)
*G06F 3/01* (2006.01)

(52) U.S. Cl.
CPC ............ *G06F 1/163* (2013.01); *G06F 1/1615* (2013.01); *G06F 3/014* (2013.01)

(58) Field of Classification Search
CPC ......... G06F 1/163; G06F 1/1615; G06F 3/014
See application file for complete search history.

(56) References Cited

U.S. PATENT DOCUMENTS

| | | |
|---|---|---|
| 8,902,173 B2 | 12/2014 | Seguine |
| 9,626,478 B2 | 4/2017 | Armstrong |
| 9,711,060 B1 | 7/2017 | Lusted et al. |
| 10,043,125 B2 | 8/2018 | Park |
| 10,165,954 B2 | 1/2019 | Lee |
| 10,185,416 B2 | 1/2019 | Mistry et al. |
| 10,863,802 B2 | 12/2020 | McLear et al. |
| 11,271,290 B2 | 3/2022 | McLear et al. |
| 11,733,790 B2 | 8/2023 | Beyhs et al. |
| 2012/0122519 A1 | 5/2012 | Jochheim |
| 2014/0107498 A1 | 4/2014 | Bower et al. |

(Continued)

FOREIGN PATENT DOCUMENTS

| | | |
|---|---|---|
| CN | 106462341 B | 2/2017 |
| JP | 5661935 B2 | 1/2015 |
| KR | 20180138135 A | 12/2018 |

OTHER PUBLICATIONS

Evering, "Evering What is it?," https://evering.jp/. 5 pages, website.

(Continued)

*Primary Examiner* — Matthew A Eason
*Assistant Examiner* — Chayce R Bibbee
(74) *Attorney, Agent, or Firm* — SoCal IP Law Group LLP; Jonathan Pearce

(57) ABSTRACT

A wearable ring for a human user, the device includes an interior loop of the ring, an exterior loop of the ring surrounding the interior loop, an interior space between the interior loop and the exterior loop. Disposed within the ring are a plurality of sensors arranged within the interior space at predetermined intervals along a circumference of the ring, such that when the exterior loop is moved closer to the interior loop at a particular point along the circumference of the ring through interaction with the exterior loop, a change detected by at least one of the sensors identifies an area near the particular point as an interaction with the ring.

16 Claims, 10 Drawing Sheets

© 2024 Sesame AI, Inc.

(56) References Cited

U.S. PATENT DOCUMENTS

| | | | | |
|---|---|---|---|---|
| 2014/0139454 | A1* | 5/2014 | Mistry | G06F 3/017 345/173 |
| 2015/0119732 | A1 | 4/2015 | Wisbey et al. | |
| 2015/0146355 | A1 | 5/2015 | Goyal et al. | |
| 2015/0190072 | A1 | 7/2015 | Armstrong | |
| 2015/0220109 | A1 | 8/2015 | von Badinski et al. | |
| 2015/0309536 | A1* | 10/2015 | Dickinson | G06F 1/163 345/173 |
| 2015/0346766 | A1 | 12/2015 | Justice et al. | |
| 2016/0058375 | A1 | 3/2016 | Rothkopf | |
| 2016/0070393 | A1 | 3/2016 | Sharma et al. | |
| 2016/0253050 | A1 | 9/2016 | Mishra et al. | |
| 2017/0207519 | A1 | 7/2017 | Tzanidis et al. | |
| 2018/0018026 | A1 | 1/2018 | Bushnell et al. | |
| 2019/0265781 | A1 | 8/2019 | Kehoe et al. | |
| 2020/0329985 | A1* | 10/2020 | Wong | A61B 5/6833 |

OTHER PUBLICATIONS

World Intellectual Property Organization, International Search Report and Written Opinion for International Application No. PCT/US2025/058744, mail date Feb. 19, 2026. pp. 1-17.

* cited by examiner

© 2024 Sesame AI, Inc.

© 2024 Sesame AI, Inc.

© 2024 Sesame AI, Inc.

© 2024 Sesame AI, Inc.

© 2024 Sesame AI, Inc.

© 2024 Sesame AI, Inc.

© 2024 Sesame AI, Inc.

© 2024 Sesame AI, Inc.

© 2024 Sesame AI, Inc.

© 2024 Sesame AI, Inc.

WEARABLE DEVICE HARDWARE INTERACTION SYSTEM FOR ARTIFICIAL INTELLIGENCE AND COMPUTING SYSTEMS

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to hardware user interfaces for computing systems and, more particularly, to a wearable device hardware interaction system for artificial intelligence and computing systems.

Description of the Related Art

There exist various input systems for computing devices. The earliest systems relied upon simply button presses or knobs and dials and switches. Eventually, the keyboard or some version thereof was standardized in the 1970s for use with computing devices. Entire systems were created, and continue to be augmented, around the keyboard. For example, Unicode text encoding enables interoperability between keyboards in different parts of the world, using different languages, and enables computers to understand input characters from various languages in various. Unicode is added to each year with several new characters, typically so-called "emojis" in the recent past. Entire languages or series of characters from languages or related to languages are added as users of that language become sufficiently computer-adept or the languages otherwise become necessary for representation.

Keyboards are particularly adept at adding text to large documents, text editing, and even programming. The use of a large set of buttons, each mapped to a particular character or function became important as data storage proliferated, computers were increasingly used for manipulating larger data sets, and as user-friendly computer programming languages based upon text became more popular. Accordingly, the hardware follows the needs of software and vice-versa to arrive at some happy equilibrium including a positive user experience.

Later, in the early 1980s, computer mice came into vogue. Many had a single button or were trackball-based or were more akin to joysticks for playing games (essentially one or more buttons mounted on a movable stalk that includes gyros measuring movement of the stalk). The mouse came to incorporate multiple buttons-typically two, but increasingly more- and was essentially standardized by the late 1980s or early 1990s.

The mouse worked particularly well for pointing to particular portions of a user interface with accuracy. The mouse was, therefore, developed in tandem with user interfaces that incorporate so-called "windows" of which Windows® by Microsoft® became the most popular. This is in part because those windows-based operating systems relied upon a series of overlapping "windows" to implement multitasking and a user needed to thereafter interact with those windows to bring one or more of those windows to the foreground in order to operate upon them. The mouse became an excellent tool for moving a visible cursor around the screen and selecting one or more windows or objects upon those windows for interaction.

In the area of video games, joysticks became common to enable players to better interact with highly-mobile style games. Later, first person shooter style games demanded that players be able to move freely about within a three-dimensional environment and were best-implemented while enabling players to freely "look" and "aim" about within that environment. So, the typical WASD (the "w" key, the "a" key, the "s" key and the "d" key standing in for directional movement of a player avatar) became standard along with so-called "mouse look" reticules which enabled a player to freely look about (and aim) within a virtual, three-dimensional environment like a game.

With the advent of consumer-grade virtual reality and augmented reality, still other interaction systems were devised. Because most players were unable to move about within the real world as they otherwise might, "jump to" functionality was often implemented enabling players to look at or otherwise designate a spot on a virtual floor in front of them, then click a button and to be transported to that position (or moved, slowly for better immersion). The so-called "mouse look" was replaced with simply turning a user's head to look about a three-dimensional virtual space (or AR space). The act of "pinching" became synonymous with "picking up" a virtual or augmented reality object visible on the display. And, visual or infrared hand tracking is increasingly used to detect these user interface interactions in place of traditional video game controller style controls. "Eye tracking" also came to be used along with player blinks or physical movements to perform certain actions (e.g. selecting or moving user interface elements). These and various other conventions have coalesced over time in the augmented reality and virtual reality spaces.

The development of technology generally can be categorized in this way. As new technology is created, the systems for interacting with and using that technology develop along with them or in a short time period thereafter. The techniques for film production initially mirrored stage plays, but gradually evolved to incorporate different interactions with the camera (e.g. so-called "coverage" and multiple perspectives or framing of shots and establishing shots for locations) that mirrored human interactions with the technology.

In another field, wearable technology has evolved to a great extent over the last ten years. In the earliest iterations of wearable computing, some of which were effectively laptops in backpacks, a tiny display projected onto glasses, and which relied upon a hand-held many-button mouse for interaction, were clunky with unusual interfaces. More-recent iterations such as the Google Glass® introduced in the early 2010s incorporated a glass display with a projector joined to a "halo" worn on a user's head in a fashion similar to eyeglasses. Interactions with the Glass were through a touchpad on the side of the glasses. Other wearables today incorporate touch-sensitive elements on their sides or perform eye tracking to enable a user to select elements within the display. Devices such as the Ray-Ban Meta® smart glasses incorporate outward-facing cameras, audio output capabilities, and a touch interface on their sides to enable minimal interaction. But, discrete, non-technical interactions with wearable devices, such as smart glasses, smartphones, other wearables (e.g. smartwatches) and the like remain convoluted, cumbersome or complex for end users. It would be preferable to have a simplified method of interaction with computing devices more generally, and particularly with wearable devices such as smart glasses that is accessible to an average consumer.

Throughout this description, elements appearing in figures are assigned three-digit or four-digit reference designators, where the most significant digits are the figure number, and the two least significant digits are specific to the element. An element that is not described in conjunction with a figure may be presumed to have the same characteristics and function as a previously-described element having the same reference designator.

DETAILED DESCRIPTION

Consumers and creators of smart glasses and other wearable computing devices have struggled to identify a suitable user interface. Motion-based actions seem to be good options, but require line of sight to a camera (e.g. a camera on the wearable) to have any accuracy. Motion based controls alone seem insufficient as it is difficult to adequately calibrate integrated inertial measurement units (IMUs) to detect motions with sufficient accuracy without a real-world anchor point (usually provided by infrared cameras or typical video cameras). As discussed above, it is awkward to carry around a video game controller or to swipe or attempt to use the side of a wearable computing device (e.g. a stem of a pair of smart glasses or a band or face of a smart watch) to control or interact with a wearable computing device.

Digital assistants such as Siri® or Alexa have offered the opportunity to control smart phones for some time. But, the interactions are fairly limited, based upon known functions or statements. A more natural interaction or a learning interaction have been basically impossible. Increasingly, these home assistants or voice assistants have been incorporating artificial intelligence capabilities, but even then, they are primarily used to assist a user in better understanding a request made on a mobile device such as a smart phone rather than enabling control of that device. And, one may not always use one's voice to communicate with a digital assistant to accomplish tasks. Sometimes more discretion is advised or desirable (e.g. interaction during an event or silently while others are talking).

It would be beneficial to have a discrete, highly-accurate controller or other interaction system for use with various wearable computing devices that did not rely upon line-of-sight, infrared, or video cameras.

Description of Apparatus

Figure 1:
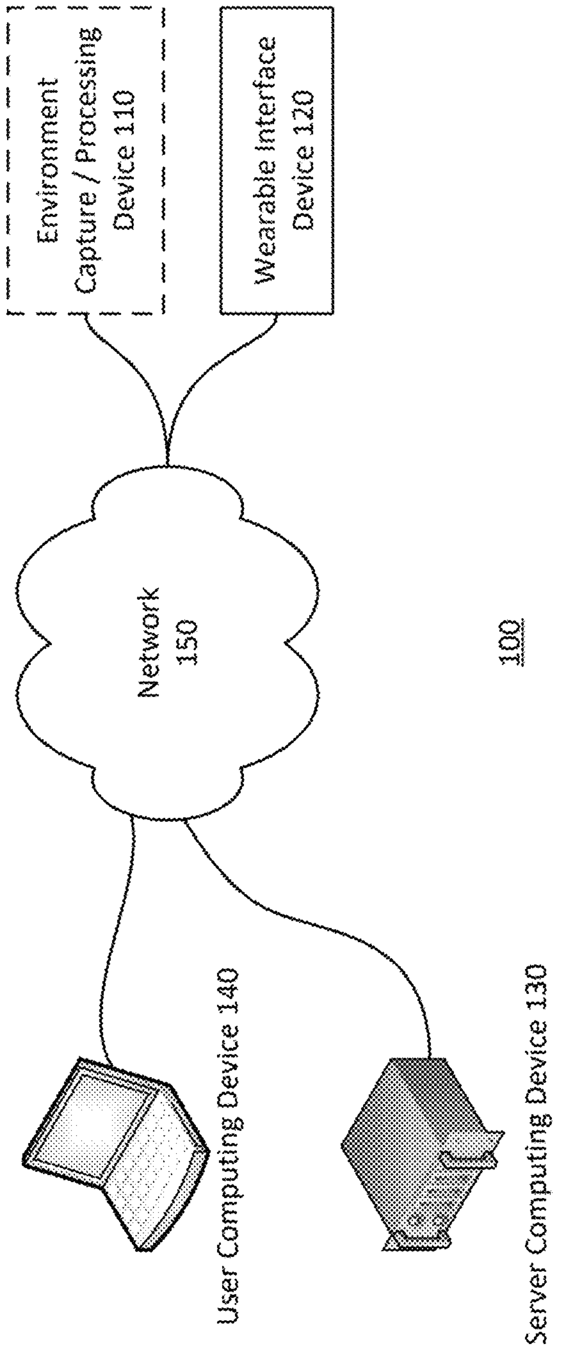
FIG. 1 is a diagram of a wearable device hardware interaction system for artificial intelligence and computing systems.

Referring now to FIG. 1, a diagram of a wearable device hardware interaction system 100 for artificial intelligence and computing systems is shown. The system 100 includes an optional environment capture/processing device 110, a wearable interface device 120, a server computing device 130, and a user computing device 140, all interconnected by a network 150.

The environment capture/processing device 110 is a computing device that incorporates one or more sensors for capturing information regarding an environment in which the wearable is being used. The device 110 is optional in the sense that it may or may not be present. This device 110 may be embodied within or as a part of a mobile device (e.g. smart phone), smart glasses, wearable lenses or displays, an augmented reality headset or a virtual reality headset, a wearable watch-like device, a chest mounted or necklace-hung camera and computing device, an earbud or pair of earbuds, a headband or hip-mounted monitor, or various other forms of wearable or portable computing devices. The environment capture/processing device 110 may in some cases be effectively a "dumb" device that relies upon the user computing device 140 and/or the server computing device 130 to process the data it generates. In some cases, the environment capture/processing device 110 may also incorporate output systems such as displays, notification lights, or speakers for audio output or responses to data it captures and/or interactions with the wearable interface device 120.

As used herein, the phrase "wearable device" means any portable computing device incorporating at least one sensor and sufficiently small that it may be worn on some portion of a user's person and/or body. The function of the environment capture/processing device 110 is to use one or more sensors to capture some aspect or aspects of an environment in which they operate (e.g. video, audio, motion, lighting, infrared, etc.) and to potential provide that data to the system 100, likely to the server computing device 130 and/or the user computing device 140 as it operates in response to the wearable interface device 120. The associated sensors may be infrared cameras, video or still cameras, microphones, gyroscopes, magnetometers, inertial measurement units (IMUs), temperature sensors, pressure sensors, environmental sensors, global positioning sensors, and the like. Examples of such "wearable devices" as that phrase is used herein and the associated sensors are set forth in the foregoing three sentences.

In situations in which the environment capture/processing device 110 is not present, the wearable user interface device 120 may interact directly or exclusively with the user computing device 140 and/or the server computing device 130. In some cases, though shown as distinct, the environment capture/processing device 110 may be integrated with one or more of the user computing device 140 and the wearable user interface device 120. Or, the environment capture/processing device 110 may be a separate wearable computing device for which the wearable interface device

120 acts as an input system, a user interface, or one of multiple potential user interfaces. In some cases, the environment capture/processing device 110 may be integrated with the user computing device 140.

The wearable user interface device 120 is a computing device for interacting with the user computing device 140, the server computing device 130, and/or the environment capture/processing device 110. The wearable user interface device 120 is a device for interacting with other computing devices in a discrete form. The wearable user interface device 120 may be, in whole or in part, a ring, a wristwatch, a band of a watch or other wearable device, an outer bezel of a wrist-worn watch, a portion of smart glasses or ordinary eyeglasses such as a portion of a stem or frame of such glasses, or may form a portion of another interaction device (e.g. a portion of a mouse or keyboard a pencil for use with capacitive screens). The function and operation of the wearable user interface device 120 will be discussed more fully below.

The server computing device 130 is a computing device that handles interactions or instructions from the user computing device 140 and/or the wearable interface device 120 and may receive input from the environment capture/processing device 110 to thereafter generate a response. The server computing device 130 may be a so-called "back-end" for a digital assistant or natural language, generative artificial intelligence and/or large language model and/or a personal, digital assistant. In such a way, the wearable interface device 120 and the other devices 110, 140 herein may offer input to the server computing device 130 and its associated systems to enable the server computing device 130 to better make decisions or otherwise response to requests with more data upon which to base those decisions or responses. The server computing device 130 is shown as a single server, but may in fact be many servers or a distributed group of so-called "cloud" servers operating in many locations substantially simultaneously.

The user computing device 140 is a computing device that may provide local processing for interactions from the wearable interface device 120 based upon data provided by the environment capture/processing device 110. In addition, the user computing device 140 may operate to communicate a unified messaging and data to the server computing device 130 upon receipt of interactions from the wearable interface device 120 and the environment capture/processing device 110. The user computing device 140 may or may not have a display or other input systems integrated or connected thereto. In some cases, the user computing device 140 may simply be a local compute node or device, without any significant input output systems other than through the associated wearable interface device and the environment capture/processing device 110 and, potentially, through still another user computing device 140 such as a mobile smartphone, tablet computer or personal computer. Though shown as a laptop form computing device, the user computing device 140 may take many forms such as a tablet computing device, a mobile phone or smart phone, a "puck" style integrated computing device that may be easily carried from place to place or with a user, a laptop, a desktop computer, a virtual reality or augmented reality headset, or similar personal computing devices. Preferably, the user computing device 140 is sufficiently small in size to be easily carried or brought with a user wearing the wearable interface device 120 for use by an individual in engaging with the user computing device using the wearable interface device 120.

The network 150 is a communications network for enabling communications between the various devices 110, 120, 130, and 140. The network 150 may be or include the internet, but likely also includes local communication protocols such as Bluetooth®, Bluetooth® low energy, 802.11x wireless, near field communications (NFC) protocols, or custom low-energy usage protocols specifically designed for purposes of enabling communications between these devices 110, 120, 130, and 140. For example, communications between the wearable interface device 120 and the user computing device 140 and potentially the environment capture/processing device 110 are preferably low-energy. And, their interconnection is such that the use of custom communications protocols may be possible for basic interactions, and when larger data throughput is necessary, reliance upon more robust and bandwidth heavy protocols and systems may be used instead (e.g. 802.11x or Bluetooth®). The network 150 is meant to embody or be presented as an abstraction of both traditional network protocols and any specialized protocols used or selected by the devices 110, 120, 130, and 140 as they communicate one with another.

Figure 2:
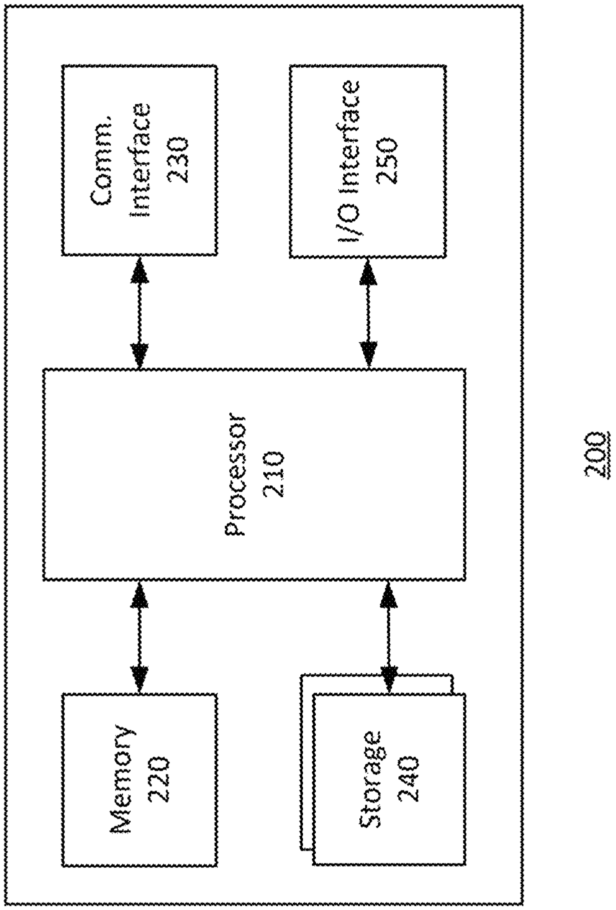
FIG. 2 is a block diagram of a computing device.

Turning now to FIG. 2 there is shown a block diagram of a computing device 200, which is representative of the computing devices 110, 120, 130, and 140 shown in FIG. 1. The computing device 200 may be, for example, a desktop or laptop computer, a server computer, a tablet, a smartphone, wearable device, or other mobile device. The computing device 200 may include software and/or hardware for providing functionality and features described herein. The computing device 200 may therefore include one or more of: logic arrays, memories, analog circuits, digital circuits, software, firmware and processors. The hardware and firmware components of the computing device 200 may include various specialized units, circuits, software and interfaces for providing the functionality and features described herein.

The computing device 200 has a processor 210 coupled to a memory 220, storage 240, a communication interface 230 and an I/O interface 250. The processor 210 may be or include one or more microprocessors, specialized processors for particular functions, field programmable gate arrays (FPGAs), application specific integrated circuits (ASICs), programmable logic devices (PLDs) and programmable logic arrays (PLAs).

The memory 220 may be or include RAM, ROM, DRAM, SRAM and MRAM, and may include firmware, such as static data or fixed instructions, BIOS, system functions, configuration data, and other routines used during the operation of the computing device 200 and processor 210. The memory 220 also provides a storage area for data and instructions associated with applications and data handled by the processor 210. As used herein the term "memory" corresponds to the memory 220 and explicitly excludes transitory media such as signals or waveforms.

The storage 240 provides non-volatile, bulk or long-term storage of data or instructions in the computing device 200. The storage 240 may take the form of a magnetic or solid state disk, tape, CD, DVD, or other reasonably high capacity addressable or serial storage medium. Multiple storage devices may be provided or available to the computing device 200. Some of these storage devices may be external to the computing device 200, such as network storage or cloud-based storage. As used herein, the terms "storage" and "storage medium" explicitly exclude transitory media such as signals or waveforms. In some cases, such as those involving solid state memory devices, the memory 220 and storage 240 may be a single device.

The communications interface 230 includes an interface to a network such as network 150 (FIG. 1). The communications interface 230 may be wired or wireless.

The I/O interface 250 interfaces the processor 210 to peripherals (not shown) such as displays, video and still cameras, microphones, keyboards and USB® devices.

Figure 3:
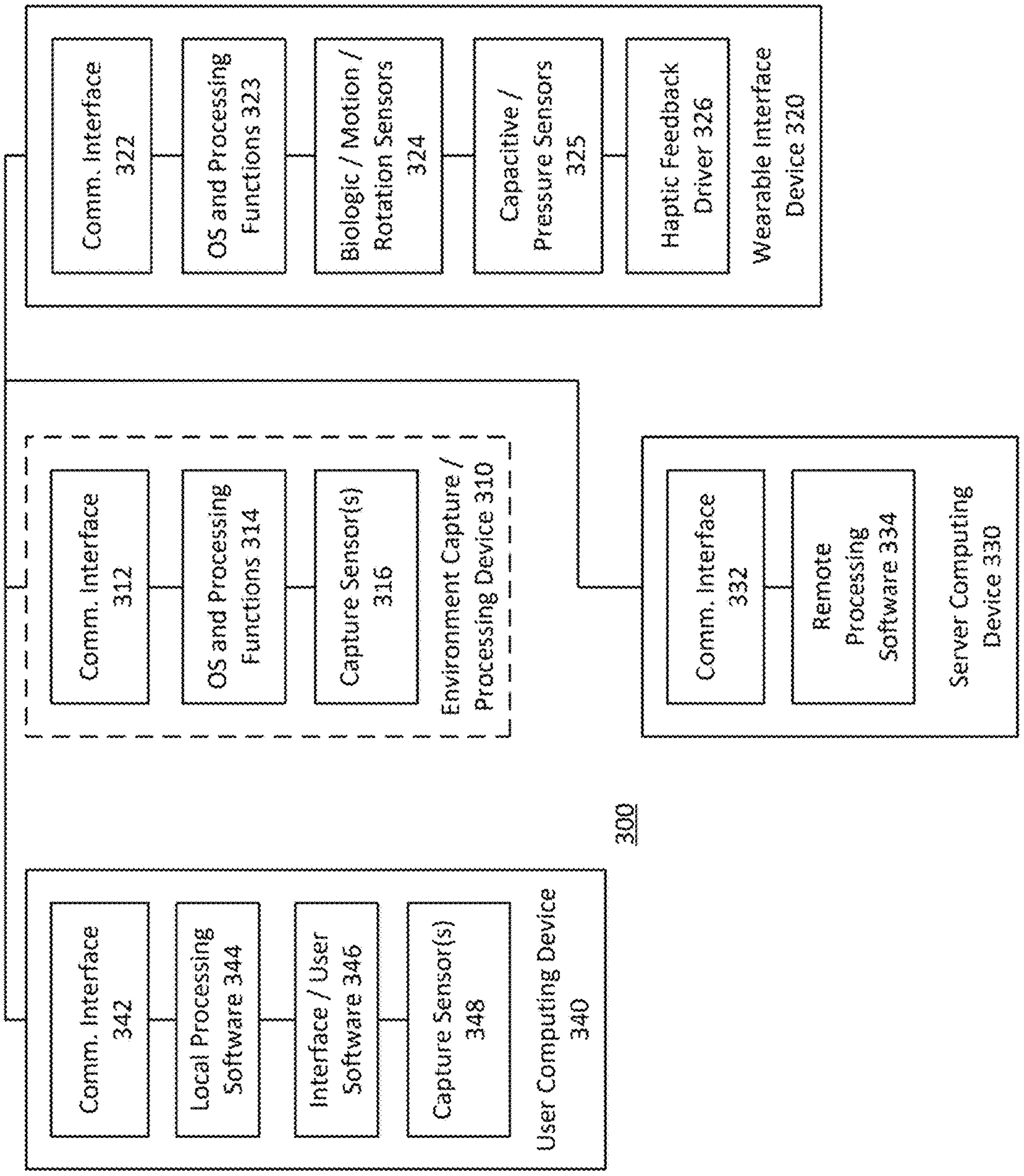
FIG. 3 is a functional diagram of a wearable device hardware interaction system for artificial intelligence and computing systems.

FIG. 3 is a functional diagram of a wearable device hardware interaction system 300 for artificial intelligence and computing systems. The system includes the optional environment capture/processing device 310, the wearable interface device 320, the server computing device 330, and the user computing device 340 of FIG. 1, element numbers 110, 120, 130 and 140, respectively. Each component of the system 300 is responsible for different functions of the overall system, but each may be made up of one or more physical systems and in some cases, as discussed above, some of the devices may be integrated with each other.

The optional environment capture/processing device 310 may or may not be present in a particular implementation. If present, the device 310 includes three functional components (others may be present), the communications interface 312, an operating system (OS) and processing functions 314, and capture sensor(s) 316. The functions disclosed may be implemented in hardware and/or software, preferably both. Herein, the letters "OS" mean operating system and other lower-level software functions.

The communications interface 312 is responsible for enabling communication between the environment capture/processing device 310 and the other components of the system 300. The communications interface 312 may include traditional networking functions such as TCP/IP communications, ethernet (for server devices discussed below), wireless 802.11x, Bluetooth® or similar protocols and systems, but may also include custom software or software front-ends suitable for interacting with the various components of the system 300. In general, the environment capture/processing device 310 will interact using the communications interface 312 with all of the other components of the system 300.

Likewise, the wearable interface device 320, the server computing device 330, and the user computing device 340 each include a communications interface 322, 332, and 342, respectively. Each of the communications interfaces 322, 332, and 342 are responsible for enabling each of the devices or components of the system 300 to communicate data with the others. The communications interfaces 322, 332, and 342 may be implemented in software with some portion of their capabilities carried out using hardware. The communications interfaces 322, 332, and 342 will not be discussed independently below unless it is to discuss their differences.

The OS and processing functions 314 are the operating system software and processing functions associated with the environment capture/processing device 310. These may simply enable the device to function, but also may operate upon the data captured by the capture sensor(s) 316 to modify or summarize or otherwise collect that data and format it for communication to the user computing device 340 or the server computing device 330. These processing functions may also interact with the wearable interface device 320 to respond to inquiries from a user or otherwise enable actions by the user.

So, for example, these functions may receive input from the wearable interface device 320 that triggers an action on the environment capture/processing device 310. These actions may be simple such as instructing a camera to capture an image or begin capturing a video. Or, they may be complex, such as triggering a large language model based digital assistant. Or, they may be based upon macros or other programming to perform a series of actions such as capturing an image, uploading it, receiving audio related to a desired tag or descriptor for that image, and instructing third party software to store that image in a particular location with the tag or descriptor spoken by a user and captured by an audio microphone that is one of the capture sensor(s) 316. The actions are virtually limitless in their possibilities, but they may be or include interactions with the other devices making up the system 300 and the internet in general.

The capture sensor(s) 316 may be or include one or more of the following: one or more cameras, one or more infrared cameras and associated infrared illuminators, audio microphone or microphones, integrated inertial measurement units (IMUs) or individual sensors typically associated with IMUs such as gyroscopes, magnetometers, accelerometers, barometric pressure sensors, altimeters, and other, similar sensors as well as any sensor fusion capabilities that combine sensor input to generate other data such as movement, location, relative change in height, calibration of multiple sensors, and the like. The capture sensor(s) 316 are intended to capture data related to elements of the exterior world that can form the basis upon which interactions from the wearable interface device 320 may operate. So, an action input by the wearable interface device 320 may cause an image capture to take place, or image processing to take place upon an image currently in the view of one or more cameras that are a part of the capture sensor(s) 316. These and many other potential actions can operate upon the data or in conjunction with the data or as a result of the data captured by the capture sensor(s) 316 and operated upon by the OS and processing functions 314.

The wearable interface device 320 is a computing device that includes functional components associated with the communications interface 322, the OS and processing functions 323, the biologic/motion/rotation sensors 324, the capacitive/pressure sensors 325, and a haptic feedback driver 326. The functions disclosed may be implemented in hardware and/or software, preferably both.

The communications interface 322 will not be discussed as it operates in much the same fashion as the communications interface 312.

The OS and processing functions 323 enable the wearable interface device 320 to function and control operation of the various sensors and haptic feedback as discussed below. In addition, the OS and processing functions 323 may serve to direct communications through the communications interface 322 with the other elements of the system 300.

The biologic/motion/rotation sensors 324 are sensors that detect aspects of movement, heart rate, respiration, and rotation of the wearable interface device (or some portion thereof) and generate corresponding data that may be used or acted upon by the wearable interface device 320 or the other elements of the system 300.

In the example of a ring-based wearable interface device, these may be optical or infrared heart rate sensors, IMUs, temperature sensors, and rotation sensors (e.g. rollers within the ring frame) that detect various movements of and characteristics of or by the human wearer of the ring. In other embodiments such as watches or necklaces or the like, these movements and associated sensors may be different or other sensors may be provided.

The capacitive/pressure sensors 325 are sensors that perform important roles as discussed more fully below. In short, the capacitive/pressure sensors 325 may detect engagement with the wearable interface device 320 through internal pressure or variable capacitance detected in one or more sensors to not only detect an action by a wearer, but also a direction of that action relative to an axis through the center point of a ring (e.g. the direction of a wearer's finger) and a amplitude or extent or forcefulness of such action. In such a way, and as discussed more fully below, the capacitive/pressure sensors 325 may detect minute distinctions between various directions in which the wearable interface device 320 is moved relative to the axis and may also detect the extent of a given interaction (e.g. small versus medium versus very large). Each of these subtleties in movement may be translated differently in associated computing devices such as the user computing device 340, or the environment capture/processing device 310 or even the server computing device 330 or in functions on the wearable interface device 320 itself implemented through the OS and processing functions 323. The functions and ways in which these capacitive/pressure sensors 325 may operate will be discussed more fully below.

The haptic feedback driver 326 serves to generate haptic feedback to a wearer of the wearable interface device 320. This haptic feedback driver 326 may or may not be present in certain cases. Where present, it may serve to indicate an interaction detected by the capacitive/pressure sensors 325 through the simulation of a "click" or may vibrate with interactions from the user computing device 340 or the environment capture/processing device 310 or may be directed by user settings associated with the OS and processing functions 323 to provide certain notifications or haptic feedback upon completion of certain actions, movement, or the like.

The server computing device is made up of the communications interface 332 and the remote processing software 334. The communications interface 332 may rely upon hard wired connections such as ethernet or fiber optic cables, but otherwise are not functionally distinct form the communications interfaces 312 and 322 discussed above. Accordingly, it will not be discussed again here.

The remote processing software 334 is software that performs processing on behalf of the other devices 310, 320, and 340 in the system 300. This remote processing may be for actions that are better-suited to larger-scale computing power than can be present in a mobile device or a wearable device. Such processes can be image processing, video processing, large language model processing, map searching or generation, web searching, directions generation (e.g. turn-by-turn directions), artificial intelligence assistants, graphics processing, and various other types of processing wherein local processing may be insufficient to quickly complete a task generate by some other device 310, 320, or 340 within the system 300.

The user computing device 340 includes a communications interface 342, local processing software 344, an interface/user software 346, and capture sensor(s) 348. The user computing device 340 may be a portable device such as a smart phone or mobile compute node or may take other computing device forms.

The communications interface 332 may rely upon hard wired connections such as ethernet or fiber optic cables, but otherwise are not functionally distinct form the communications interfaces 312 and 322 discussed above. Accordingly, it will not be discussed again here.

The local processing software 344 operates to interact with the wearable interface device 320 to perform functions that the OS and processing functions 323 of the wearable interface device 320 is incapable of performing or is not sufficiently powerful or lacks access to data or sensors to perform. In a typical case, the user computing device 340 may be a mobile smart phone or a portable compute node. In either case, the user computing device 340 may have access to cellular networks, GPS data, more powerful processors and software, data associated with the user of the wearable interface device 320 and/or user computing device 340 (e.g. calendar, contacts, etc.), and other capabilities or sensors that are unavailable to the wearable interface device 320.

Accordingly, the local processing software 344 may integrate data received from the wearable interface device 320 and its myriad sensors and data or processing power or information unavailable or inefficient to store or have present on the wearable interface device 320 and may act upon it to perform various functions. Or, the local processing software may receive direction from or data indicating that the wearable interface device is being interacted with in a way that indicates that the user wishes to take an action or begin a process. In response, the local processing software 344 may take the associated action or begin the associated process.

The interface/user software 346 may be the user interface of the user computing device 340 itself and any associated user software which may or may not interact with the wearable interface device 320 or other elements of the system 300. In some cases, the wearable interface device 320 may rely upon user-installed software to function or to track data or to customize the response to input received from the wearable interface device 326. Other user software may be present as well.

The capture sensor(s) 348 may be one or more sensors, of the types described elsewhere herein, for detecting various attributes of the surroundings of the device 340, the user of the device 340, or movement of or information pertaining to the device or the user. Certain sensors or sensor types may be sufficiently large or power hungry that they are difficult or inefficient to add to the wearable interface device 320 itself and instead may be stored in the user computing device 340.

Figure 4:
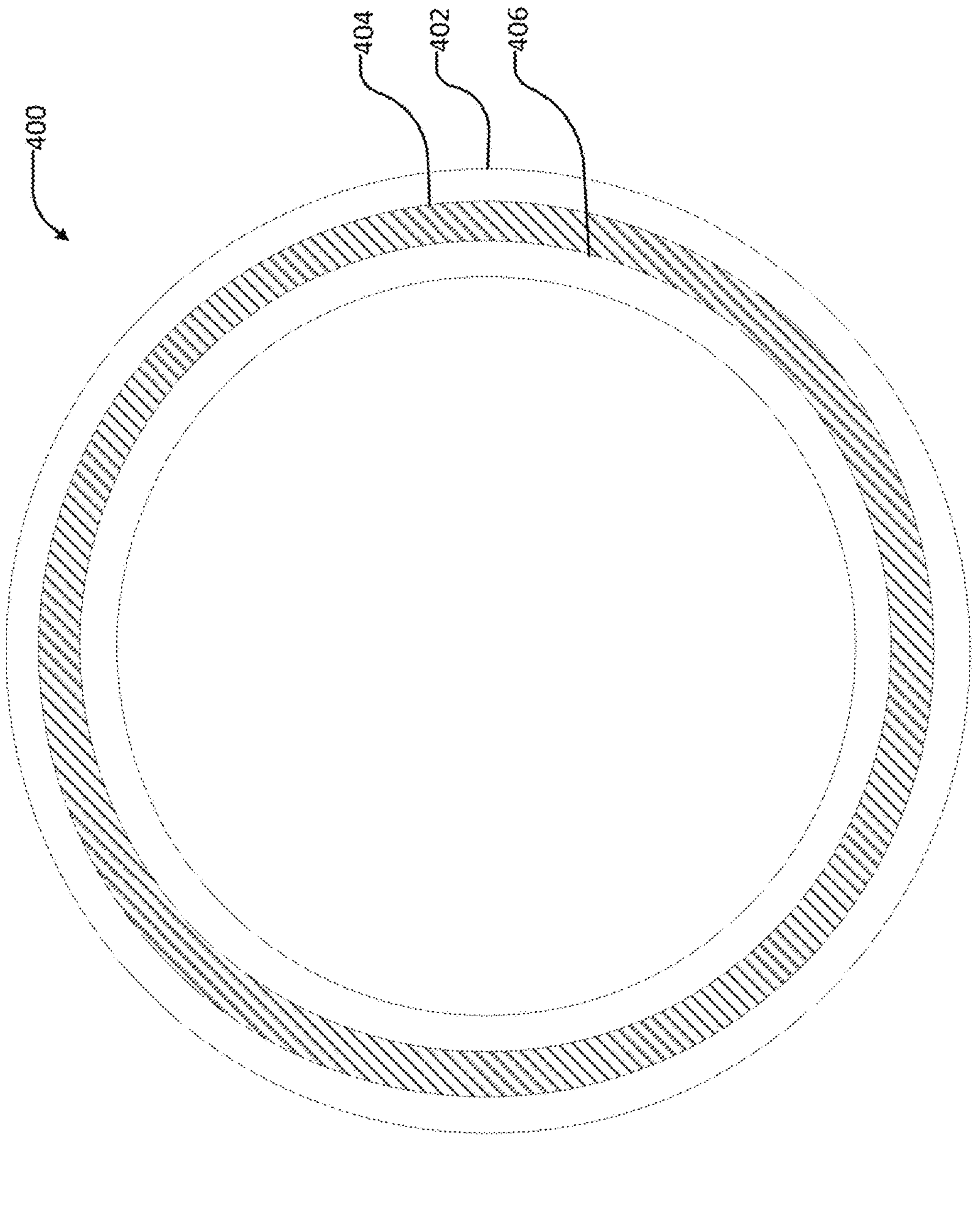
FIG. 4 is an example wearable device.

FIG. 4 is an example wearable device 400. This wearable device 400 is a ring with an exterior loop 402, an interior loop 406 and an interior space 404.

The exterior loop 402 is preferably made of a material that is aesthetically pleasing since it is visible to the wearer and others while the ring is worn. Preferably, due to fashion, the material is a metal, precious or otherwise, carbon fiber, a polymer, silicone, or a polished stone or manmade stone. However, it may be of any sufficiently hard material to provide protection and be worn by a wearer including injection molded plastic.

The interior loop 406 may be of any suitable material, such as those described for the exterior loop 402, but more likely is a polished plastic, polymer or epoxy.

The interior space 404 may be effectively hollow to house electronic components (e.g. sensors, batteries, processors, memory, etc.) or may be semi-hollow (hollow in portions, filled with compressible material in others) or may be filled with a compressible non-conductive material such as an oil-based gel or similar material such that the interior loop and exterior loop may be compressed such that they are closer together, but may not fully touch (which may cause damage to any electronics disposed within the interior space 404). The non-conductive material may be a non-conductive fluid, rubber, air, oxygen, nitrogen, or a plurality of compression springs of a non-conductive material. A gel-like material may provide resistance to compression of varying levels but may provide feedback as the interior loop 406 and exterior loop 404 are pressed together as discussed more fully below.

A compression stop (not shown) may also be included in the interior space 404 which may prohibit compression of the interior loop 406 toward the exterior loop 402 beyond a certain point. That point may be to prohibit damage to electronics housed within the interior space 404 that may occur if either the interior loop 406 or the exterior loop 402 touched the electronics within the interior space 404.

Within the interior space 404, any electronics disposed therein may be affixed to either or both of the interior loop 406 or the exterior loop 402 within the interior space 404. And, in some cases, certain electronics may be exposed to the exterior (e.g. charging connectors, thermometers, optical heart rate monitors reliant upon infrared or other visible frequencies of light, etc.) of either the interior loop 406 (e.g. abutting a human finger or other body part) or the exterior loop 402 (open to the air for charging or ambient temperature sensing and the like).

Other types of wearable devices, like the ring of wearable device 400 are possible. These include, but are not limited to, bracelets, watch bands and bezels, earrings, necklaces, earbuds or other headphones, eyeglasses themselves or their components (e.g. hinges, stems, frames), heart rate monitors, chest straps, and other, similar, wearable devices. The implementation of the processes described below may vary dependent upon the type of wearable device in which they are placed.

Figure 5:
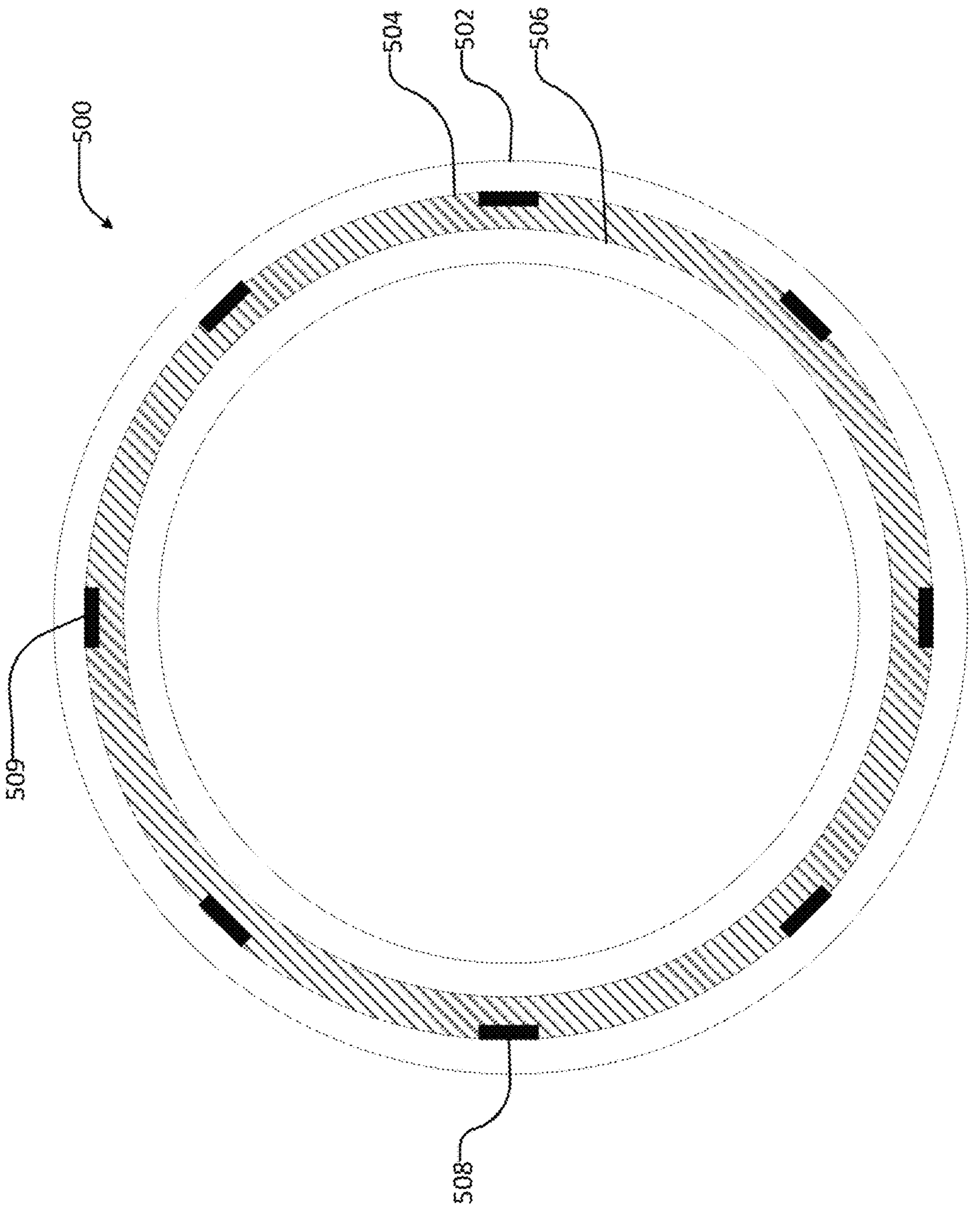
FIG. 5 is an example wearable device showing a plurality of sensors.

FIG. 5 is an example wearable device 500 showing a plurality of sensors. The wearable device still includes the exterior loop 502, the interior space 504, and the interior loop 506 shown in FIG. 4 (as 402, 404, and 406, respectively).

A plurality (eight in this example) of sensors 508, 509 are disposed within the interior space 504. The sensors 508, 509 and others (not labelled) are shown as affixed to the interior of the exterior loop 502. However, they may be affixed to the interior of the interior loop 506 as well. Or, they may be embedded in either loop (e.g. flush with the material of the exterior loop 502 or interior loop 506. They are shown as affixed to the interior of the exterior loop 502 for illustrative purposes. Also, while eight sensors 508, 509 are shown in FIG. 5, more or fewer sensors may be used to accomplish the same results. As few as two sensors may be suitable to accomplish the processes described herein.

These sensors are the capacitive/pressure sensors 325 of FIG. 3. If capacitive sensors are used, they will detect an increase or a drop in capacitance as a difference between the potential of two uncharged conductors. This operates in much the same way as a capacitive touchscreen display. Except here, unlike in a capacitive touchscreen, the two uncharged conductors are the interior loop 506 and the exterior loop 502 of the wearable device 500. As the interior loop 506 is compressed closer to the exterior loop 502 upon which the sensors 508, 509 are affixed, the capacitance increases. This enables the capacitive sensors to operate to detect movement of the interior loop 506 toward the exterior loop 502 of greater than a predetermined threshold to indicate selection or actuation or otherwise indicate a desire to cause an action to occur in a matter similar to a “click” of a traditional computer mouse.

Further, the plurality of sensors enables compression of the interior loop 506 toward the exterior loop 502 to be detected uniquely in as many locations as there are capacitive sensors present. So, collectively, these detected capacitances can be used by the wearable interface device 320 or the user computing device 340 to determine a location around the circumference of the wearable interface device 320 where the highest compression is being made and where the lowest compression is being made. Similar sensors may be employed in wrist-worn wearable interface devices or watch bezels or various other form factors disclosed herein.

Capacitance is proportional to the closeness of the two conductive materials (e.g. the material approaching the capacitive sensor when compressed), so in addition to thresholds, minute levels of adjustment and detection are possible such that capacitance may be used to increase a volume slider or to make a small adjustment in color or to change a channel as more or less compression is detected. The sensors may be sufficiently granular to detect very small changes in the capacitance associated with each capacitive sensor. And, this sensitivity can also be used to purposefully exclude small changes or abrupt changes that are more likely to be false positives than intention of a user to activate or otherwise engage the systems associated with the sensors 508, 509 activation.

In the case of a plurality of pressure sensors (e.g. strain gauges) being used, the pressure sensors simply detect compression (and potentially a level of compression) of the interior loop 506 toward the exterior loop 502. These changes may operate in much the same way when detected, but the detection itself may take place via a direct sending of the compression as opposed to increased capacitance. Video game controllers are one such situation where compression buttons are used for full compression (activation) and granular gradients from fully uncompressed to fully compressed. Similar sensors which detect the increasing compression as pressure on one or more sensors (and on the opposite side of the ring reduction in pressure) may operate otherwise in a manner similar to that described above with respect to capacitive sensors.

In such a case, preferably, absolute pressure sensors may be used. These are pressure sensors that encapsulate their sensors within a vacuum so that the pressure changes detected are absolute (as opposed to relative to the ambient barometric pressure which can be associated with weather changes or changes in altitude or depth). These sensors are more accurate for consistently detecting precise changes in pressure (e.g. increased compression or strain on the strain gauge).

Figure 6:
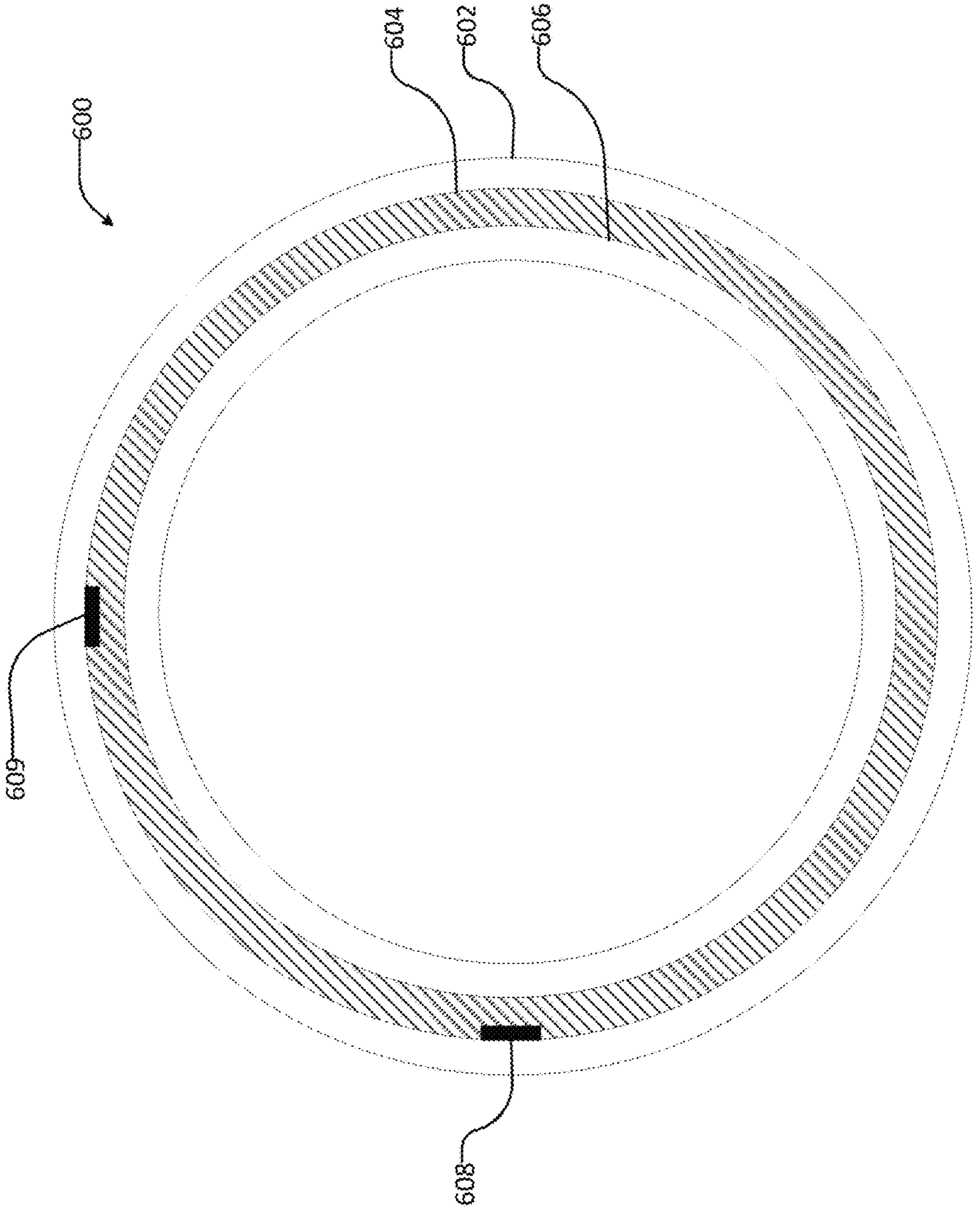
FIG. 6 is an example wearable device showing two sensors.

FIG. 6 is an example wearable device 600 showing two sensors. Here, the same interior loop 506, exterior loop 502, and interior space 504 are shown. However, only two sensors 608 and 609 are shown. At a minimum, only two capacitive and/or pressure sensors may be required to determine both a force and a direction of any given compression. These two sensors 608 and 609 can have their data extrapolated, reliant upon the circular nature of the ring-based wearable interface device 320, to determine both an amount of force (or compression) and its direction relative to an axis centered at the center of the circle making up the ring when quadrature sensing is used. The quadrature sensing system used for this purpose will be discussed below with respect to FIG. 8 and FIG. 10. In short, as few as two sensors arranged within plus or minus fifteen degrees of ninety degrees of separation around the circumference of a circular object are sufficient to enable detection of deflection of another object (e.g. by pressure or by capacitance differences). This is discussed more fully below.

Figure 7B:
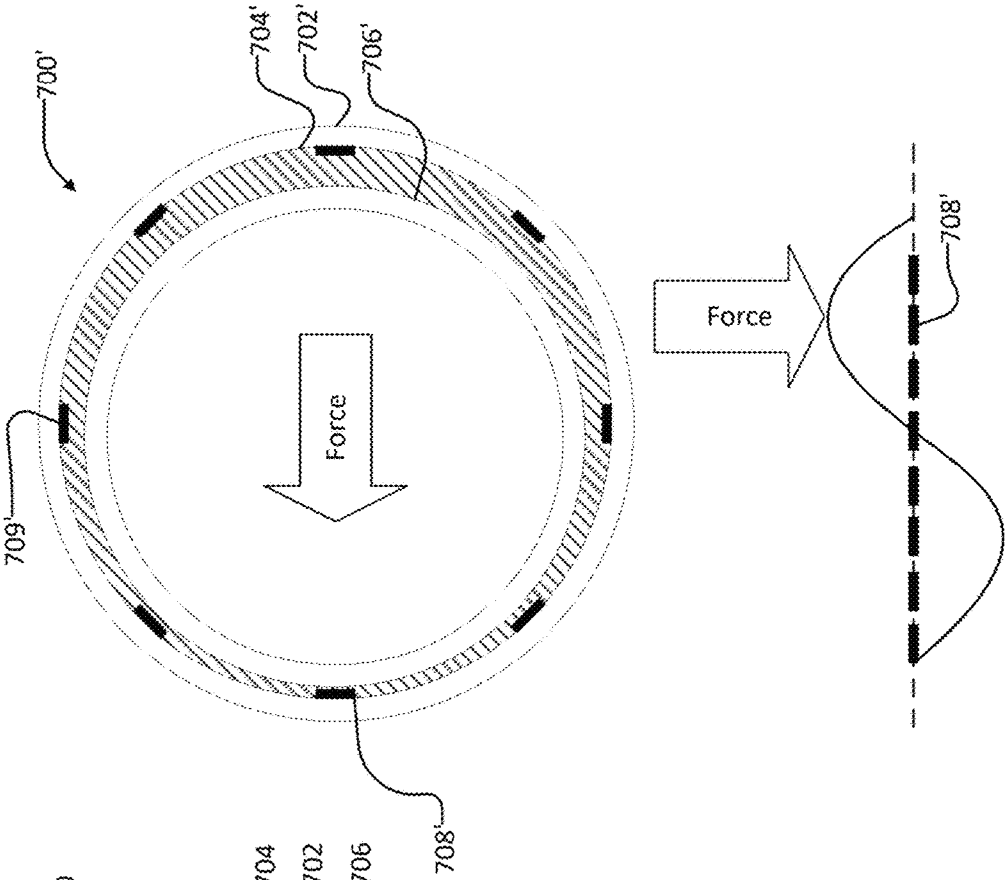
FIG. 7, made up of FIGS. 7A and 7B, is an example wearable device showing force detection reliant upon eight sensors.
Figure 7A:
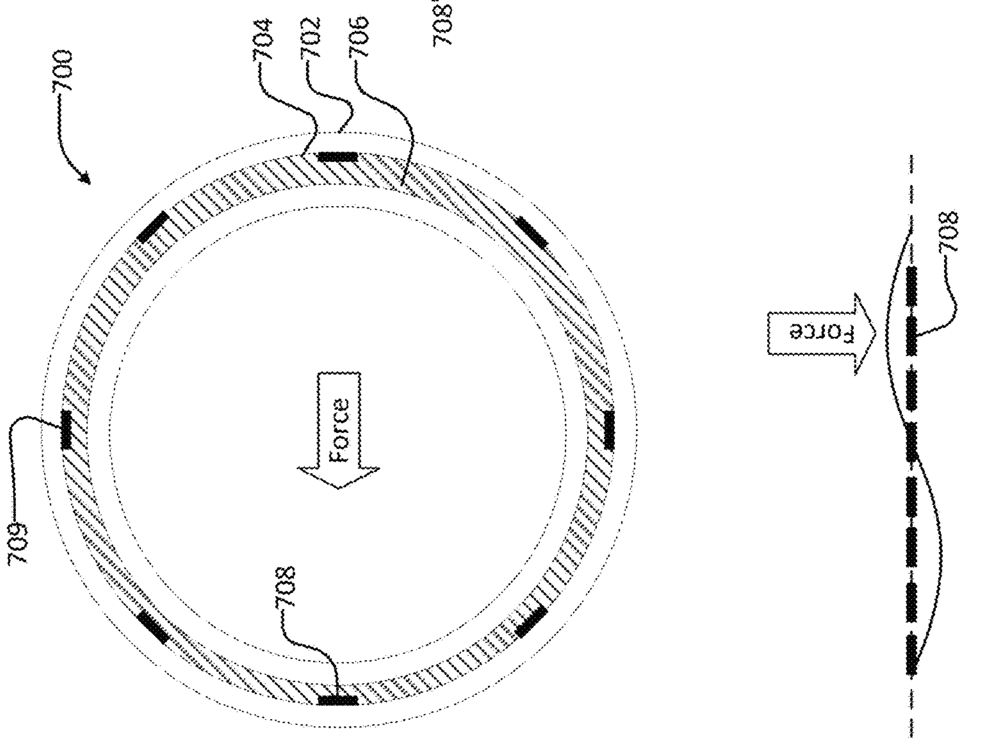

FIG. 7, made up of FIGS. 7A and 7B, shows example wearable devices 700, 700' showing force detection reliant upon a plurality of sensors. FIGS. 7A and 7B include the exterior loop 702, 702', the interior space 704, 704', the exterior loop 706, 706', and the associated sensors 708, 708', 709, and 709'.

The upper portions of FIGS. 7A and 7B are the wearable devices 700, 700'. The lower portion are graphs showing the relative compression/capacitance detected by the capacitive sensors and/or absolute pressure sensors. Each sensor is represented in both cases by the dark, black rectangles. Because the wearable devices 700, 700' have interior and exterior loops 702, 706 which are circular and rigid (e.g. the ring's material is generally not itself manually compressible by a human, only compressible toward one another, or at a minimum less-compressible than any material in the interior space 704, 704'), when compression increases at one point (e.g. over one of the sensors), it decreases by an equal amount at a point one hundred eighty degrees around the circumference of the interior loop 706, 706'.

In FIG. 7A, a relatively light force has compressed the interior loop 706 toward the exterior loop 702. The resulting detected force (or capacitance curve) is shown in the lower portion of FIG. 7A for each corresponding sensor. The force is centered around sensor 708. In FIG. 7B, a stronger force is compressed the interior loop 706' toward the exterior loop 702'. The resulting detected force (or capacitance curve) is shown in the lower portion of FIG. 7B for each corresponding sensor. The force is again centered around sensor 708'. However, the force is stronger, so the resulting curve has a higher amplitude meaning that the absolute pressure or capacitance is higher than that in FIG. 7A. The sensors used herein are sufficiently precise to detect changes like this and their magnitude. A typical present-day force sensor is capable of detecting changes as small as 0.1 N (or a capacitance sensor may be variable based upon the particular tolerances of the materials and sensors, but generally a change of more than 10-20% in capacitance can be used as a threshold to detect interaction). An example operation of such sensors and corresponding processing will be discussed with respect to FIGS. 9 and 10 below.

Figure 8A:
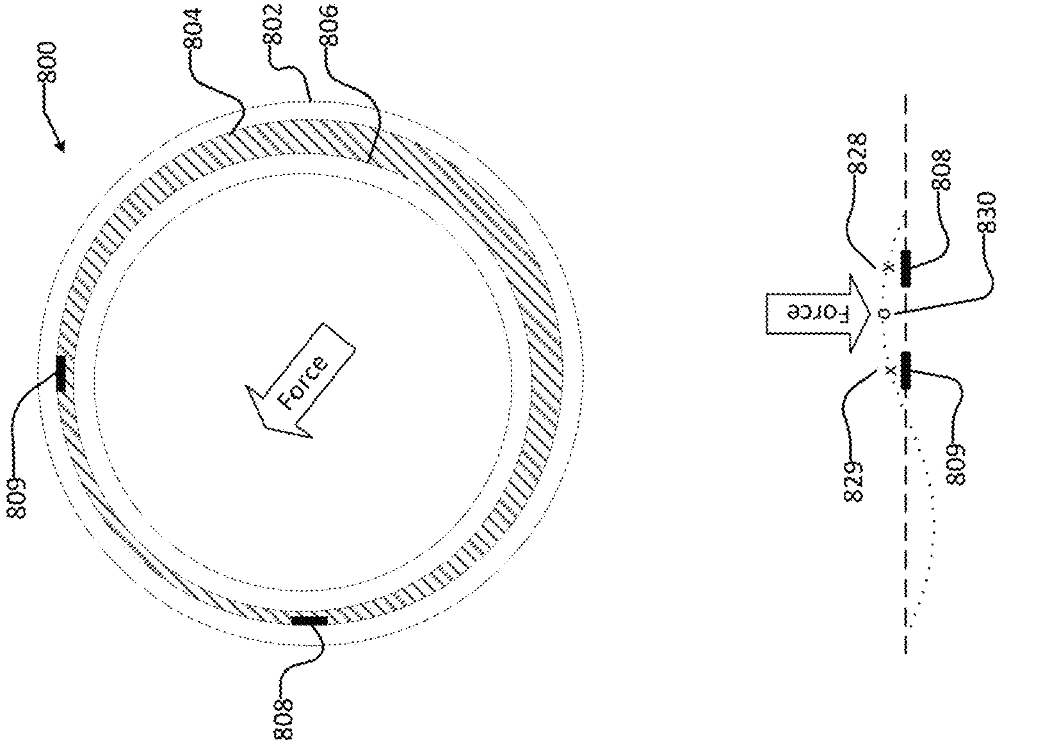
FIG. 8, made up of FIGS. 8A and 8B, is an example wearable device showing force detection reliant upon two sensors.
Figure 8B:
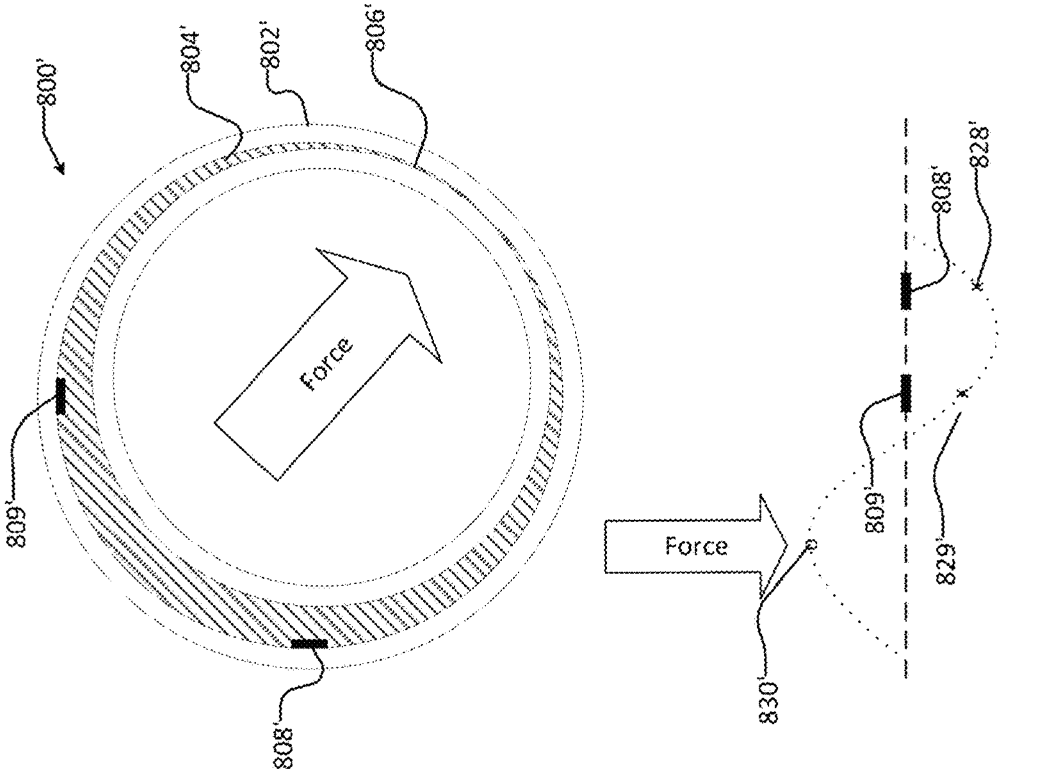

FIG. 8, made up of FIGS. 8A and 8B, shows example wearable devices 800, 800' showing force detection reliant upon two sensors. FIGS. 8A and 8B include the exterior loop 802, 802', the interior space 804, 804', the exterior loop 806, 806', and the associated sensors 808, 808', 809, and 809'.

The upper portions of FIGS. 8A and 8B are the wearable devices 800, 800'. The lower portion are graphs showing the relative compression/capacitance detected by the capacitive sensors and/or absolute pressure sensors. Each sensor is represented in both cases by the dark, black rectangles. Because the wearable devices 800, 800' are rings which are circular, when compression increases at one point (e.g. over one of the sensors), it decreases by an equal amount at a point one hundred eighty degrees around the circumference of the interior loop 806, 806'. But, in addition, the pressure applied in a given direction generally conforms to a traditional sine wave, largest at the point of pressure and/or highest capacitance, and lowest at the point 180 degrees around the circumference therefrom.

Because of this, wearable devices 800, 800' can rely upon as few as only two absolute pressure and/or capacitance sensors to derive the location (again, around the circumference of the ring) of a given compression and its magnitude as well. In FIG. 8A, a compression to the upper left is shown, directly between the two sensors. The increased capacitance (or pressure) is detected at points 829 and 828 by sensors 809 and 808, respectively. Because the wearable device is a known shape—in this case a circle—the two points 829 and 828 can be extrapolated to fill out the entire sine wave. The dotted line is the extrapolated curve, and the point 830 is the center point for the force that results from the extrapolation. This is accomplished via quadrature sensing. At least two points are needed to form the resulting wave.

FIG. 8B is similar, but a higher compressive force is shown. Here, the force is applied to the downward left as shown in FIG. 8B. This moves the highpoint of the sin wave to the opposite side away from the two sensors. The capacitance (or absolute pressure) detected at those locations drops, rather than increasing, as that compression in an opposite direction is applied. The two points where the pressure (or capacitance) are detected as lower because the interior loop 806 has moved away from the exterior loop 802 at those two sensor 809', 808' locations, are mapped as points 829' and 828'. The sine wave may be interposed thereon using quadrature math to result in point 830' as the center point for the compression being applied to the ring, thereby determining its magnitude and its location along the circumference of the wearable device 800'.

In this way, as few as two sensors disposed along the circumference of a ring-shaped wearable device are sufficient to derive both magnitude of compression and its location or at least a very close approximation of its location. Using fewer sensors saves costs in manufacturing, lowers the likelihood of the sensors breaking, preserves precious interior space 804' for other electronics, batteries, and sensors, and otherwise simplifies manufacturing and design process for wearable devices. In other shapes, similar mathematics may be applied to reduce the number of necessary sensors based upon known characteristics of the wearable device's shape and construction.

Description of Processes

Figure 9:
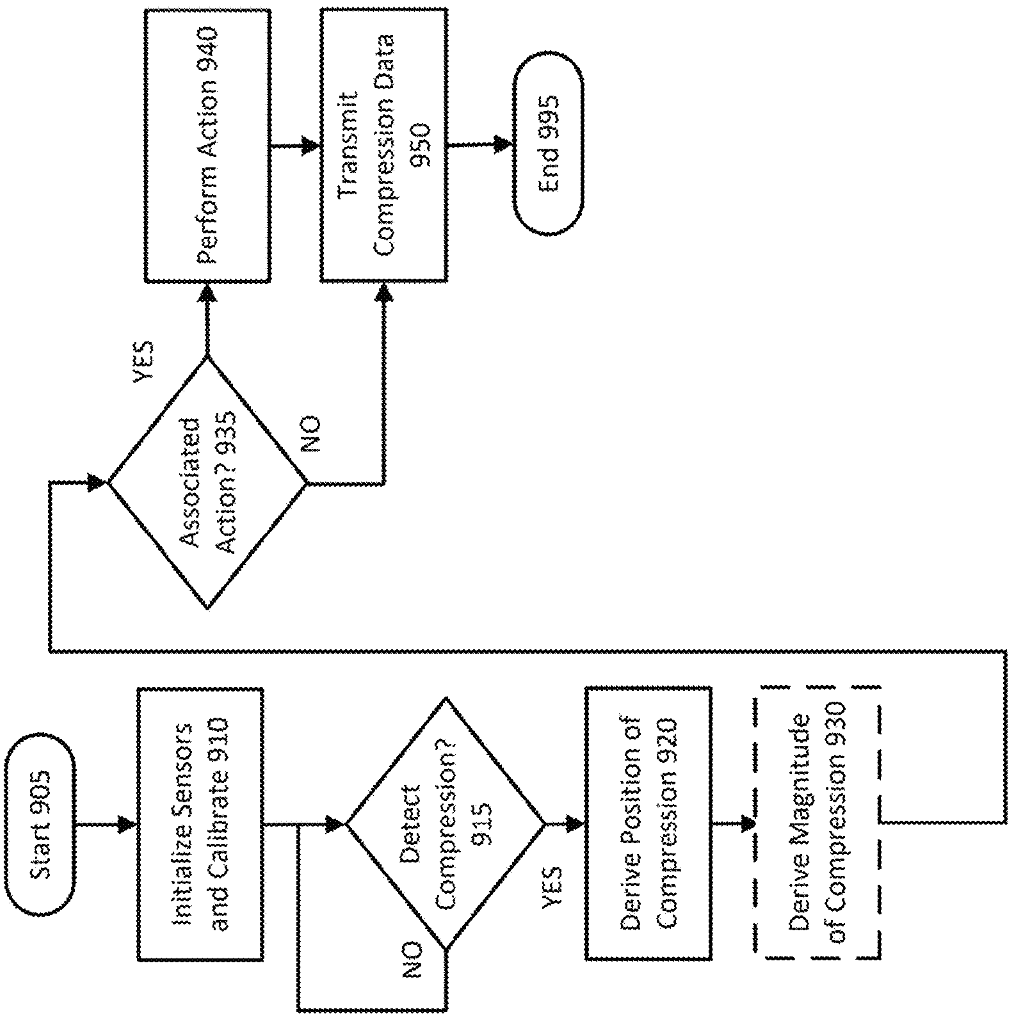
FIG. 9 is a flowchart of a process for use of a wearable device hardware interaction system for artificial intelligence and computing systems.

FIG. 9 is a flowchart of a process for use of a wearable device hardware interaction system for artificial intelligence and computing systems. The process begins at start 905 and ends at end 995, but may take place many times iteratively through several interactions with a wearer and resulting actions.

After the start 905, the process begins with initialization and calibration of the sensors at 910. A baseline value for the sensors (capacitive or absolute pressure) must be created from a neutral or as-neutral-as-possible state. With the baseline readings, the ability of the sensors to detect magnitude of compression which may be representative of incidental or trivial compression such as simple day-to-day activity or incidental contact while wearing the wearable interface device 320, these contacts may be identified as trivial as opposed to intentional and may not trigger any response from the associated software. So, a baseline measurement, perhaps over a few seconds, may be established at this point.

Alternatively, initialization and calibration may take place on a continuous or semi-continuous basis. Averages of readings from one or more sensors may be used to establish a baseline. Over the course of many minutes or hours wearing the ring (or other wearable device), predetermined thresholds may be established as "baseline" non-interaction while clear compression actions may be detected as beyond those predetermined thresholds. The thresholds may be updated continuously or periodically in response to changes in baseline states of the various sensors.

Once the sensors have been initialized and calibrated (or while it is ongoing), a determination whether a compression has been detected may take place at 915. This may only be relative to the baseline state calibrated at 910. If there is no compression detected ("no" at 915), the process may wait compression at a later time.

If compression is detected ("yes" at 915), meaning that the capacitive or absolute pressure sensors have captured, and associated processing power either in the wearable interface device 320 itself or in one of the other devices 310, 330, or 340 (FIG. 3) have detected that the compression exceeds a predetermined threshold or baseline, then detection of a position of the compression along the circumference (or otherwise with differently-shaped objects) may take place at 920.

Here, the location where the compression is derived so as to potentially use that information to initiate different actions or responses by any one of the devices 310, 320, 330, or 340 used in conjunction with the wearable interface device 320. The position of the compression being centered at one point along the wearable interface device 320 may mean one action should be executed, while the compression being centered at another point may mean a different action should be taken.

Other actions combined with compression are also possible to open up a large array of potential inputs. The internal strain gauges and/or capacitance sensors or additional, exterior surface capacitance sensors (or other touch sensors) and enable "swipe-like" gestures along its exterior. In this way, movements along the surface (e.g. "swipes") of the exterior of the ring or wearable device may be detected as distinct interactions. These may be associated with actions in themselves, and may be associated with still other actions when combined with compression detection (whether by force or capacitance as described above). So, for example, a compression at a particular location or direction, in addition to a swipe along the exterior of the outer ring in one direction, may be associated with one action, while a swipe in a different direction may be associated with a different action. The swipe may be activated by swipes beginning and ending in a particular portion of the exterior of the wearable device. Or, alternatively, the swipe may be activated no matter where it begins or ends so long as it is in one direction or the other along the exterior of the wearable device.

Still further alternatively, detected compression at 915 may be a series of compressions along the interior of the wearable device such that the series of compressions effectively is a "swipe like" gesture for the wearable device in a given direction (e.g. clockwise or counter-clockwise). Each of those gestures in succession is detection of compression in series ("yes" at 915) and may result in determinations regarding the potions of those compressions at 920 (and their magnitude at 930) and determinations regarding any associated action at 935. In this way a "compression swipe" in at least two directions may be possible. A "cross-swipe" may be possible too, with a compression on a "top" and a compression on a "bottom" of the ring or a "left" and a "right" following in rapid succession which may likewise be associated with different actions. Similarly, "double-click" or "triple-click" like functions (or still more clicks) or alternative clicks (e.g. top, followed by bottom) may be possible, along with multiple swipes or series of compressions.

The exterior of the wearable interface device 320 may have ridges, or compressed sections, symbols (visible or touch-apparent) or otherwise physically-discernable indications of a position so that a wearer can differentiate between one or the other when compressing a portion of the ring. A single ridge or bump or indentation may designate a center point or an under point (e.g. the interior of the hand) so that a user may discretely interact with the ring, and select portions of the ring to compress without visually inspecting the ring. This is all the more necessary where the ring is the wearable interface device and it may be essentially uniform throughout its exterior circumference.

Next, an optional step of deriving a magnitude of the compression at 930 may take place. Because capacitance is proportionally related to the closeness of two conductive plates making up the capacitor, the relative compression's magnitude at the point detected at 920 can be discerned if such information is desirable or useful. So, in some cases, a "strong force" as shown in FIG. 8B may be differentiable form a weaker one in FIG. 8A. Absolute pressure sensors operate similarly in that the total change in pressure can be exactly provided for each individual sensor in the plurality of sensors to indicate both pressure, and a particular point on the exterior of the wearable device where that compression is being provided or is centered around. A hard compression may indicate a particular action should take place or otherwise instruct the system 300 (FIG. 3) to engage in certain actions or behaviors while a weaker or less compression at the same position may indicate that a different action or behavior should be enabled or ceased. If relevant, or helpful, the sensors of the wearable interface device (FIG. 3) may optionally derive the magnitude of the compression 930 using processing power to compute that compression from the two or more sensors used.

Once the position and, optionally, magnitude are derived from the sensor data, an associated action may be related to that position and/or magnitude. If there is an associated action ("yes" at 935), then that action is performed at 940.

Example actions that may be associated with this compression position and/or magnitude. For example, a particular compression or even a pattern of compression/non-compression may instruct an associated device (for example, devices 310, 330, or 340) to capture a video or still image. Or, a particular compression may instruct a device to initiate an artificial intelligence or large language model assistant to listen for audio input. Another particular compression may instruct a device to begin recording a workout or series of actions. A compression may cause an email to be sent, GPS tracking to be enabled, a telephone call with a spouse or significant other or other contact to be initiated. The compression actions based on position, magnitude, patterns, and duration may all be mapped using software with particular actions being taken by one or more devices.

If there is no associated action with that position and/or magnitude ("no" at 935), then the compression data may be transmitted to an external device (e.g. one of the devices 310, 330, or 340 of FIG. 3) for further action or simply recording or ignoring dependent upon the situation at 950.

The process then ends at end 995.

Figure 10:
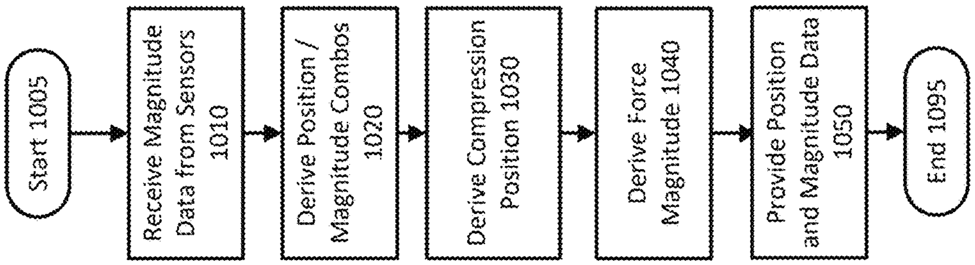
FIG. 10 is a flowchart of a process for using quadrature sensing to detect a location of compression on a wearable device.

FIG. 10 is a flowchart of a process for using quadrature sensing to detect a location of compression on a wearable device. The process has a beginning at start 1005 and an end at end 1095. However, the process may take place many times iteratively for various actuations of the wearable interface device (and/or associated computing devices) upon which it is operating.

Following the start 1005, the process begins with receipt of the receipt of the magnitude data from the sensors at 1010. As discussed briefly above, the magnitude of the compression (or capacitance) of at least two sensors is required to use quadrature sensing to identify a compression position along the circumference of a ring (or similar circular device). So, two points (though more could be used as well) are received from the sensors at 1010.

Next, the position/magnitude combinations are derived at 1020. Here, a computing device, which may be the wearable interface device 320, or any of the other devices 310, 330, or 340, uses the magnitude sensor data from at least two sensors to derive the position of those compression measurements. This process may be inherent in some cases (e.g. a sensor position is fixed and only magnitude and the name or position of the sensor need be provided along with that data to perform this derivation).

Next, the magnitude and position of the detected compression (or negative compression if the sensor(s) are opposite the compression occurring) is used to derive the compression position at 1030. This is the place where the compression is being made by a wearer. As discussed above, if at least two points along a curve are known, it will conform to a typical sine curve and only vary as to magnitude. All other points along that same curve can be derived therefrom, including the point with the highest peak (e.g. the compression point or an area nearby that compression point).

Next, the magnitude for that compression point may be derived at 1040. This is possible for the same reason. Once the two points along the sine curve are known, the peak may also be known. A high peak indicates high compression, while a low peak is low compression. An absolute value may be calculated from the values of the known two (or more) points, thereby deriving the magnitude of the compression point or a point nearby.

By way of example, the compression resistance of the material within the interior space may be approximately 75 to 100 micrometers thick, with a force of approximately 10 newtons to compress completely, and the sensors may detect changes in force of 0.1 newtons or more. Capacitance alterations can be even more finely grained in their resolution.

Next, the position and magnitude data derived may be provided to one of the other devices 310, 330, or 340 as described above at 1050. This data may be used to perform other actions such as selecting an element, activating a process or activity, starting a workout tracking system, beginning or requesting directions or instructions, beginning a phone call or ending a phone call, activating a voice activated large language model assistant or similar artificial intelligence system, or virtually any other action that may be taken with a mobile or computing device.

The process then ends at 1095

CLOSING COMMENTS

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

The invention claimed is:

1. A wearable device comprising:
an interior loop of the wearable device;
an exterior loop of the wearable device surrounding the interior loop;
an interior space between the interior loop and the exterior loop;
two sensors arranged within the interior space at predetermined intervals, such that:
a first sensor of the two sensors is arranged in a position along the circumference within the interior space; and
a second sensor of the two sensors is arranged at a position of a known number of degrees along the circumference from the first sensor within the interior space;
quadrature sensing enables the use of the first and second sensors to detect the area near the particular point at which pressure is applied to any portion of the exterior loop when the two sensors are arranged ninety degrees apart along the circumference; and
when the exterior loop is moved closer to the interior loop at a particular point along the circumference of the exterior loop, the movement of the exterior loop closer to the interior loop is detected by at least one of the sensors at an area near the particular point, the particular point associated with a specific function.

2. The wearable device of claim 1 further comprising:
one or more processors and associated memory; and
at least one communications interface for communicating with other computing devices.

3. The wearable device of claim 1 wherein the two sensors are capacitive sensors and a change in capacitance is directly proportional to an amount the exterior loop is moved toward the interior loop at the particular point.

4. The wearable device of claim 3 wherein the interior space at least partially filled with a non-conductive material and wherein the non-conductive material includes at least one material selected from the group comprising: non-conductive fluid, rubber, air, oxygen, nitrogen, and a plurality of compression springs of a non-conductive material.

5. The wearable device of claim 1 wherein the two sensors are strain gauges.

6. The wearable device of claim 1 wherein:
when the exterior loop is moved closer to the interior loop along a path beginning at the particular point along the circumference of the exterior loop and continuing along a path to a second particular point in a direction along the exterior loop, the path and the direction are detected by at least one of the two sensors.

7. A wearable ring, the ring comprising:
an interior loop of the ring;
an exterior loop of the ring surrounding the interior loop;
an interior space between the interior loop and the exterior loop;
two sensors arranged within the interior space at predetermined intervals along a circumference of the ring, such that:
a first sensor of the two sensors is arranged in a position along the circumference within the interior space; and a second sensor of the two sensors is arranged at a position of a known number of degrees along the circumference from the first sensor within the interior space;

quadrature sensing enables the use of the first and second sensors to detect variations in respective first and second capacitance to thereby derive the area near the particular point when the two sensors are arranged ninety degrees apart along the circumference when the exterior loop is moved closer to the interior loop at a particular point along the circumference of the ring through interaction with the exterior loop, the movement is detected by at least one of the sensors changes, identifying an area near the particular point as an interaction with the ring, the particular point associated with a specific function; and the area near the particular point differentiable from other points along the circumference is associated with a particular action for execution and other actions for execution are associated with the other points along the circumference; and wherein the two sensors are capacitive sensors and a change in capacitance is directly proportional to an amount the exterior loop is moved toward the interior loop at the particular point such that when a capacitance detected exceeds a first predetermined threshold, it is associated with a first action for execution and when the capacitance detected exceeds a second predetermined threshold, it is associated with a second action.

8. The wearable device of claim 6 further comprising:

one or more processors and associated memory; and at least one communications interface for communicating with other computing devices.

9. The wearable ring of claim 7 wherein the capacitance is identified as associated with the area near the particular point as differentiable from other points along the circumference.

10. The wearable ring of claim 7 wherein when the exterior loop is moved relative to the interior loop at the particular point along the circumference of the exterior loop, a second capacitance detected by the second sensor increases or decreases thereby enabling a processor associated with the ring to derive a location along the circumference of the ring of the area near the particular point.

11. The wearable ring of claim 7 wherein:

when the exterior loop is moved closer to the interior loop along a path beginning at the particular point along the circumference of the exterior loop and continuing along a path to a second particular point in a direction along the exterior loop, the path and the direction detected by at least one of the two sensors.

12. A wearable ring, the ring comprising:

an interior loop of the ring;

an exterior loop of the ring surrounding the interior loop;

an interior space between the interior loop and the exterior loop, at least partially filled with a pliable, non-conductive material;

a first capacitive sensor of a plurality of sensors is arranged in a position along the circumference within the interior space;

a second capacitive sensor of a plurality of sensors is arranged at a position of a known number of degrees along the circumference within the interior space;

the plurality of sensors arranged such that quadrature sensing enables the first and second capacitive sensors to detect variations in respective a first and second capacitance when the exterior loop is moved relative to the interior loop at a particular point to derive the area near the particular point thereby enabling a processor associated with the ring to derive a location along the circumference of the ring of the area near the particular point.

13. The wearable ring of claim 12 wherein the area near the particular point is differentiable from other points along the circumference and is associated with a particular action for execution and other actions for execution are associated with the other points along the circumference.

14. The wearable ring of claim 12 wherein a first and second capacitance detected is directly proportional to an amount the exterior loop is moved toward the interior loop at the particular point.

15. The wearable ring of claim 12 wherein when the capacitance detected exceeds a first predetermined threshold, it is associated with a first action for execution and when the capacitance detected exceeds a second predetermined threshold, it is associated with a second action.

16. A wearable device comprising:

an interior loop of the wearable device;

an exterior loop of the wearable device surrounding the interior loop;

an interior space between the interior loop and the exterior loop;

a plurality of sensors arranged within the interior space at predetermined intervals, such that:

a first sensor of the plurality of sensors is arranged in a position along the circumference within the interior space;

a second sensor of the plurality of sensors is arranged at a position of a known number of degrees apart along the circumference from the first sensor within the interior space; and when the exterior loop is moved closer to the interior loop at a particular point along the circumference of the exterior loop, quadrature sensing enables the use of the first and second sensors to detect the area near the particular point at which pressure is applied to any portion of the exterior loop when the two sensors are arranged the known number of degrees apart along the circumference.

* * * * *